US007877438B2

(12) United States Patent
Schrempp et al.

(10) Patent No.: US 7,877,438 B2
(45) Date of Patent: *Jan. 25, 2011

(54) METHOD AND APPARATUS FOR IDENTIFYING NEW MEDIA CONTENT

(75) Inventors: James B. Schrempp, Saratoga, CA (US); Vance Ikezoye, Los Gatos, CA (US); Erling H. Wold, El Cerrito, CA (US); Louis Kvitek, San Jose, CA (US)

(73) Assignee: Audible Magic Corporation, Los Gatos, CA (US)

( * ) Notice: Subject to any disclaimer, the term of this patent is extended or adjusted under 35 U.S.C. 154(b) by 1060 days.

This patent is subject to a terminal disclaimer.

(21) Appl. No.: 09/999,763

(22) Filed: Oct. 23, 2001

(65) Prior Publication Data
US 2003/0033321 A1 Feb. 13, 2003

Related U.S. Application Data

(63) Continuation-in-part of application No. 09/910,680, filed on Jul. 20, 2001.

(51) Int. Cl.
*G06F 15/16* (2006.01)
(52) U.S. Cl. .................. 709/203; 709/201; 709/231
(58) Field of Classification Search .......... 709/104, 709/203; 700/94; 713/193, 194
See application file for complete search history.

(56) References Cited

U.S. PATENT DOCUMENTS

| 3,919,479 | A | | 11/1975 | Moon et al. ............... 179/1 SB |
| 4,230,990 | A | * | 10/1980 | Lert et al. ................. 135/48 |
| 4,449,249 | A | * | 5/1984 | Price ......................... 455/45 |
| 4,450,531 | A | | 5/1984 | Kenyon et al. ............ 364/604 |
| 4,454,594 | A | | 6/1984 | Hefron et al. |
| 4,677,455 | A | | 6/1987 | Okajima ..................... 357/38 |
| 4,677,466 | A | * | 6/1987 | Lert et al. ................... 725/22 |
| 4,739,398 | A | * | 4/1988 | Thomas et al. ............. 725/22 |

(Continued)

FOREIGN PATENT DOCUMENTS

EP 0349106 A1 1/1990

(Continued)

OTHER PUBLICATIONS

L. Baum et al., A Maximization Technique Occurring in the Statistical Analysis of Probabilistic Functions of Markov Chains, *The Annals of Mathematical Statistics*,, vol. 41, No. 1 pp. 164-171, 1970 (no month).

(Continued)

*Primary Examiner*—John Follansbee
*Assistant Examiner*—Dhairya A Patel
(74) *Attorney, Agent, or Firm*—Blakely, Sokoloff, Taylor & Zafman LLP

(57) ABSTRACT

A new media identification system is disclosed. In one aspect, a system may comprise at least one analysis module for receiving and analyzing an received work and generating a corresponding representation thereof; at least one identification (ID) server for receiving the representation from the at least one analysis module and generating a list of unidentifiable received works. A method for identifying new media is also disclosed. In one aspect, a method may comprise receiving an unidentified segment; determining whether the unidentified segment is similar to previously received unidentified segments; and sequentially arranging similar unidentified segments in a single super segment.

96 Claims, 7 Drawing Sheets

U.S. PATENT DOCUMENTS

| | | | |
|---|---|---|---|
| 4,843,562 A | 6/1989 | Kenyon et al. | 364/487 |
| 4,918,730 A | 4/1990 | Schulze | 381/43 |
| 5,210,820 A | 5/1993 | Kenyon | 395/2 |
| 5,247,688 A | 9/1993 | Ishigami | |
| 5,283,819 A | 2/1994 | Glick et al. | 379/90 |
| 5,327,521 A | 7/1994 | Savic et al. | |
| 5,437,050 A | 7/1995 | Lamb et al. | 455/2 |
| 5,442,645 A | 8/1995 | Ugon | |
| 5,504,518 A * | 4/1996 | Ellis et al. | 725/22 |
| 5,581,658 A | 12/1996 | O'Hagan et al. | 395/22 |
| 5,588,119 A | 12/1996 | Vincent | |
| 5,612,729 A * | 3/1997 | Ellis et al. | 725/22 |
| 5,612,974 A | 3/1997 | Astrachan | |
| 5,613,004 A | 3/1997 | Cooperman et al. | |
| 5,638,443 A | 6/1997 | Stefik et al. | |
| 5,692,213 A | 11/1997 | Goldberg et al. | |
| 5,701,452 A | 12/1997 | Siefert | |
| 5,710,916 A | 1/1998 | Barbara et al. | |
| 5,724,605 A | 3/1998 | Wissner | |
| 5,732,193 A | 3/1998 | Aberson | |
| 5,850,388 A | 12/1998 | Anderson et al. | |
| 5,918,223 A * | 6/1999 | Blum et al. | 707/1 |
| 5,924,071 A | 7/1999 | Morgan et al. | |
| 5,930,369 A | 7/1999 | Cox et al. | |
| 5,943,422 A | 8/1999 | Van Wie et al. | |
| 5,949,885 A | 9/1999 | Leighton | |
| 5,959,659 A | 9/1999 | Dokic | |
| 5,983,176 A | 11/1999 | Hoffert et al. | |
| 6,006,183 A * | 12/1999 | Lai et al. | 704/235 |
| 6,006,256 A | 12/1999 | Zdepski et al. | 709/217 |
| 6,011,758 A | 1/2000 | Dockes et al. | 369/30 |
| 6,026,439 A * | 2/2000 | Chowdhury et al. | 709/223 |
| 6,044,402 A | 3/2000 | Jacobson et al. | 709/225 |
| 6,067,369 A | 5/2000 | Kamei | |
| 6,088,455 A | 7/2000 | Logan et al. | |
| 6,092,040 A | 7/2000 | Voran | |
| 6,096,961 A | 8/2000 | Bruti et al. | |
| 6,118,450 A | 9/2000 | Proehl et al. | 345/349 |
| 6,192,340 B1 * | 2/2001 | Abecassis | 704/270 |
| 6,195,693 B1 | 2/2001 | Berry et al. | |
| 6,229,922 B1 | 5/2001 | Sasakawa et al. | |
| 6,243,615 B1 | 6/2001 | Neway et al. | |
| 6,243,725 B1 | 6/2001 | Hempleman et al. | |
| 6,253,193 B1 | 6/2001 | Ginter et al. | 714/38 |
| 6,253,337 B1 | 6/2001 | Maloney et al. | 714/38 |
| 6,279,010 B1 | 8/2001 | Anderson | 707/202 |
| 6,279,124 B1 | 8/2001 | Brouwer et al. | 714/38 |
| 6,285,596 B1 | 9/2001 | Miura et al. | |
| 6,330,593 B1 | 12/2001 | Roberts et al. | |
| 6,345,256 B1 | 2/2002 | Milsted et al. | |
| 6,374,260 B1 | 4/2002 | Hoffert et al. | 707/104.1 |
| 6,385,596 B1 | 5/2002 | Wiser et al. | |
| 6,418,421 B1 | 7/2002 | Hurtado et al. | |
| 6,422,061 B1 | 7/2002 | Sunshine et al. | |
| 6,438,556 B1 * | 8/2002 | Malik et al. | 707/101 |
| 6,449,226 B1 | 9/2002 | Kumagai | |
| 6,452,874 B1 | 9/2002 | Otsuka et al. | |
| 6,453,252 B1 | 9/2002 | Laroche | 702/75 |
| 6,460,050 B1 | 10/2002 | Pace et al. | |
| 6,463,508 B1 | 10/2002 | Wolf et al. | |
| 6,477,704 B1 | 11/2002 | Cremia | |
| 6,487,641 B1 | 11/2002 | Cusson | |
| 6,490,279 B1 | 12/2002 | Chen et al. | |
| 6,496,802 B1 | 12/2002 | van Zoest et al. | |
| 6,526,411 B1 | 2/2003 | Ward | |
| 6,542,869 B1 | 4/2003 | Foote | |
| 6,550,001 B1 | 4/2003 | Corwin et al. | |
| 6,550,011 B1 | 4/2003 | Sims, III | |
| 6,552,254 B2 * | 4/2003 | Hasegawa et al. | 84/609 |
| 6,591,245 B1 | 7/2003 | Klug | |
| 6,609,093 B1 | 8/2003 | Gopinath et al. | |
| 6,609,105 B2 | 8/2003 | Van Zoest et al. | |
| 6,628,737 B1 | 9/2003 | Timus | |
| 6,636,965 B1 | 10/2003 | Beyda et al. | |
| 6,654,757 B1 | 11/2003 | Stern | |
| 6,732,180 B1 | 5/2004 | Hale et al. | |
| 6,771,316 B1 * | 8/2004 | Iggulden | 348/553 |
| 6,771,885 B1 | 8/2004 | Agnihotri et al. | |
| 6,834,308 B1 | 12/2004 | Ikezoye et al. | |
| 6,947,909 B1 | 9/2005 | Hoke, Jr. | |
| 6,968,337 B2 | 11/2005 | Wold | |
| 7,043,536 B1 | 5/2006 | Philyaw et al. | |
| 7,047,241 B1 | 5/2006 | Erickson et al. | |
| 7,058,223 B2 | 6/2006 | Cox et al. | |
| 7,181,398 B2 | 2/2007 | Thong et al. | |
| 7,266,645 B2 | 9/2007 | Garg et al. | |
| 7,269,556 B2 | 9/2007 | Kiss et al. | |
| 7,281,272 B1 | 10/2007 | Rubin et al. | |
| 7,289,643 B2 * | 10/2007 | Brunk et al. | 382/100 |
| 7,349,552 B2 | 3/2008 | Levy et al. | |
| 7,363,278 B2 | 4/2008 | Schmelzer et al. | |
| 7,500,007 B2 | 3/2009 | Ikezoye et al. | |
| 7,529,659 B2 | 5/2009 | Wold | |
| 7,562,012 B1 | 7/2009 | Wold | |
| 7,565,327 B2 | 7/2009 | Schmelzer | |
| 7,593,576 B2 | 9/2009 | Meyer et al. | |
| 2001/0013061 A1 * | 8/2001 | DeMartin et al. | 709/217 |
| 2001/0027522 A1 | 10/2001 | Saito | |
| 2001/0034219 A1 | 10/2001 | Hewitt et al. | |
| 2001/0037304 A1 | 11/2001 | Paiz | 705/52 |
| 2001/0056430 A1 | 12/2001 | Yankowski | |
| 2002/0049760 A1 | 4/2002 | Scott et al. | |
| 2002/0064149 A1 | 5/2002 | Elliott et al. | |
| 2002/0082999 A1 | 6/2002 | Lee et al. | 705/51 |
| 2002/0087885 A1 | 7/2002 | Peled et al. | 713/201 |
| 2002/0120577 A1 | 8/2002 | Hans et al. | |
| 2002/0123990 A1 | 9/2002 | Abe | |
| 2002/0129140 A1 | 9/2002 | Peled et al. | |
| 2002/0133494 A1 | 9/2002 | Goegdken | |
| 2002/0152262 A1 | 10/2002 | Arkin et al. | |
| 2002/0156737 A1 | 10/2002 | Kahn et al. | |
| 2002/0158737 A1 | 10/2002 | Yokoyama | |
| 2002/0186887 A1 | 12/2002 | Rhoads | |
| 2002/0198789 A1 | 12/2002 | Waldman | |
| 2003/0014530 A1 | 1/2003 | Bodin et al. | 709/231 |
| 2003/0018709 A1 | 1/2003 | Schrempp et al. | |
| 2003/0023852 A1 | 1/2003 | Wold | |
| 2003/0033321 A1 | 2/2003 | Schrempp et al. | |
| 2003/0037010 A1 | 2/2003 | Schmelzer et al. | |
| 2003/0061352 A1 * | 3/2003 | Bohrer et al. | 709/226 |
| 2003/0061490 A1 | 3/2003 | Abajian | |
| 2003/0095660 A1 | 5/2003 | Lee et al. | |
| 2003/0135623 A1 | 7/2003 | Schrempp | |
| 2003/0191719 A1 | 10/2003 | Ginter et al. | |
| 2003/0195852 A1 | 10/2003 | Campbell et al. | |
| 2004/0008864 A1 | 1/2004 | Watson et al. | |
| 2004/0010495 A1 | 1/2004 | Kramer et al. | |
| 2004/0053654 A1 | 3/2004 | Kokumai et al. | |
| 2004/0073513 A1 | 4/2004 | Stefik et al. | |
| 2004/0089142 A1 | 5/2004 | Georges et al. | |
| 2004/0133797 A1 | 7/2004 | Arnold | |
| 2004/0148191 A1 | 7/2004 | Hoke, Jr. | |
| 2004/0163106 A1 | 8/2004 | Schrempp et al. | |
| 2004/0167858 A1 | 8/2004 | Erickson | |
| 2004/0201784 A9 * | 10/2004 | Dagtas et al. | 348/738 |
| 2005/0021783 A1 | 1/2005 | Ishii | |
| 2005/0039000 A1 | 2/2005 | Erickson | |
| 2005/0044189 A1 | 2/2005 | Ikezoye et al. | |
| 2005/0097059 A1 | 5/2005 | Shuster | |
| 2005/0154678 A1 | 7/2005 | Schmelzer | |
| 2005/0154680 A1 | 7/2005 | Schmelzer | |
| 2005/0154681 A1 | 7/2005 | Schmelzer | |
| 2005/0216433 A1 | 9/2005 | Bland et al. | |
| 2005/0267945 A1 | 12/2005 | Cohen et al. | |

| | | | |
|---|---|---|---|
| 2005/0289065 | A1 | 12/2005 | Weare |
| 2006/0034177 | A1 | 2/2006 | Schrempp |
| 2006/0062426 | A1 | 3/2006 | Levy et al. |
| 2007/0074147 | A1 | 3/2007 | Wold |
| 2007/0078769 | A1 | 4/2007 | Way et al. |
| 2008/0008173 | A1 | 1/2008 | Kanevsky et al. |
| 2008/0133415 | A1 | 6/2008 | Ginter et al. |
| 2008/0141379 | A1 | 6/2008 | Schmelzer |
| 2008/0154730 | A1 | 6/2008 | Schmelzer |
| 2008/0155116 | A1 | 6/2008 | Schmelzer |
| 2009/0030651 | A1 | 1/2009 | Wold |
| 2009/0031326 | A1 | 1/2009 | Wold |
| 2009/0043870 | A1 | 2/2009 | Ikezoye et al. |
| 2009/0077673 | A1 | 3/2009 | Schmelzer |
| 2009/0089586 | A1* | 4/2009 | Brunk et al. ............... 713/176 |
| 2009/0192640 | A1 | 7/2009 | Wold |
| 2009/0240361 | A1 | 9/2009 | Wold et al. |
| 2009/0328236 | A1 | 12/2009 | Schmelzer |

FOREIGN PATENT DOCUMENTS

| | | |
|---|---|---|
| EP | 0 402 210 A1 | 12/1990 |
| EP | 0 459 046 A1 | 12/1991 |
| EP | 0 517 405 A2 | 12/1992 |
| EP | 0 402 210 B1 | 8/1995 |
| EP | 0689316 A2 | 12/1995 |
| EP | 0731446 | 9/1996 |
| EP | 0 859 503 A2 | 8/1998 |
| EP | 0 859 503 A3 | 12/1999 |
| EP | 1 449 103 A1 | 8/2004 |
| EP | 1 485 815 A1 | 12/2004 |
| EP | 1 593 018 A2 | 11/2005 |
| EP | 1354276 B1 | 12/2007 |
| EP | 1485815 B1 | 10/2009 |
| WO | 96/36163 A2 | 11/1996 |
| WO | 96/36163 A3 | 11/1996 |
| WO | 98/20672 A2 | 5/1998 |
| WO | 98/20672 A3 | 5/1998 |
| WO | 00/05650 A1 | 2/2000 |
| WO | 00/39954 A1 | 7/2000 |
| WO | WO 00/63800 | 10/2000 |
| WO | 01/23981 A1 | 4/2001 |
| WO | WO 01/62004 | 8/2001 |
| WO | WO 02/03203 | 1/2002 |
| WO | 02/15035 A2 | 2/2002 |
| WO | 02/15035 A3 | 2/2002 |
| WO | WO 02/15035 | 2/2002 |
| WO | 02/37316 A2 | 5/2002 |
| WO | 02/37316 A3 | 5/2002 |
| WO | 02/082271 A1 | 10/2002 |
| WO | 03/007235 A1 | 1/2003 |
| WO | 03/009149 A1 | 1/2003 |
| WO | 03/036496 A1 | 5/2003 |
| WO | 03/067459 A1 | 8/2003 |
| WO | WO 03/091990 A1 | 11/2003 |
| WO | 2004/044820 A1 | 5/2004 |
| WO | WO 2004/070558 A2 | 8/2004 |
| WO | WO 2006/015168 A2 | 2/2006 |
| WO | WO 2009/017710 | 2/2009 |

OTHER PUBLICATIONS

A. P. Dempster et al. "Maximum Likelihood from Incomplete Data via the $EM$ Algorithm", *Journal of the Royal Statistical Society. Series B (Methodological)*, vol. 39, Issue 1, pp. 1-38, 1977 (no month).

D. Reynolds et al., "Robust Text-Independent Speaker Identification Using Gaussian Mixture Speaker Models", *IEEE Transactions on Speech and Audio Processing*, vol. 3, No. 1, pp. 72-83, Jan. 1995.

B. Pellom et al., "Fast Likelihood Computation Techniques in Nearest-Neighbor Based search for Continuous Speech Recognition", *IEEE Signal Processing Letters*, vol. 8. No. * pp. 221-224, Aug. 2001.

J. Haitsma et al., "Robust Audio hashing for Content Identification", *CBMI 2001, Second International Workshop on Content Based Multimedia and Indexing*, Sep. 19-21, 2001, Brescia, Italy., Sep. 19-21, 2001.

Baum, L., et al., A maximization technique occurring in the statistical analysis of probalistic functions of Markov chains, *The Analysis of Mathematical Statistics*, vol. 41, pp. 164-171 1970, (no month).

Dempster, A.P., et al., "Maximum likelihood from incomplete data via the $EM$ Algorithm", *Journal of the Royal Statistical Society, Series B (Methodological)*, vol. 39 Issue 1 pp. 31-38, 1977 (no month).

Haitsma, J., et. al., "Robust audio hashing for content identification", *CBMI 2001, Second International Workshop on Content Based Multimedia and Indexing*, Sep. 19-21, 2001, Brescia, Italy., Sep. 19-21, 2001, 8 pages.

Ohtsuki, K., et al. "Topic extraction based on continuous speech recognition in broadcast-news speech" *Automatic speech recognition and understanding*, 1997. Proceedings 1997 IEEE workshop on Santa Barbara, CA, USA Dec. 14-17, 1997, New York, NY, USA, IEEE, US, Dec. 14, 1997, pp. 527-534 XP010267477 ISBN: 0-7803-3698-4.

Pellom, B., et al., "Fast likelihood computation techniques in nearest neighbor search for continuous speech recognition.", *IEEE Signal Processing Letters*, vol. 3 No. *pp. 221-224 Aug. 2001.

Reynolds, D., et al., "Robust text-independent speaker identification using Gaussian mixture speaker models", *IEEE Transactions on Speech and Audio Processing*, vol. 8 No. * pp. 72-83 Jan. 1995.

Zawodney, Jeremy D., "A C Program to compute CDDB discids on Linux and free BSD," [internet] http://jeremy.zawodny.com/c/discid-linux-1.3tar.gz, 1 page, Apr. 14, 2001, retrieved Jul. 17, 2007.

Beritelli, F., et al., "Multilayer Chaotic Encryption for Secure Communications in packet switching Networks," IEEE, vol. 2 Aug. 2000, pp. 1575-1582.

Blum, T., Keislar, D., Wheaton, J., and Wold, E., "Audio Databases with Content-Based Retrieval," Prodeedings of the 1995 International Joint Conference on Artificial Intelligence (IJCAI) Workshop on Intelligent Multimedia Information Retrieval, 1995.

Breslin, Pat, et al., Relatable Website, "Emusic uses Relatable's open source audio recongnition solution, TRM, to signature its music catabblog for MusicBrainz database," http://www.relatable.com/news/pressrelease/001017.release.html, Oct. 17, 2000.

Cosi, P., De Poli, G., Prandoni, P., "Timbre Characterization with Mel-Cepstrum and Neural Nets," Proceedings of the 1994 International Computer Music Conference, pp. 42-45, San Francisco, No date.

Feiten, B. and Gunzel, S., "Automatic Indexing of a Sound Database Using Self-Organizing Neural Nets," Computer Music Journal, 18:3, pp. 53-65, Fall 1994.

Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.

Foote, J., "A Similarity Measure for Automatic Audio Classification," Institute of Systems Science, National University of Singapore, 1977, Singapore.

Gonzalez, R. and Melih, K., "Content Based Retrieval of Audio," The Institute for Telecommunication Research, University of Wollongong, Australia, No date.

Keislar, D., Blum, T., Wheaton, J., and Wold, E., "Audio Analysis for Content-Based Retrieval" Proceedings of the 1995 International Computer Music Conference.

Scheirer, E., Slaney, M., "Construction and Evaluation of a Robust Multifeature Speech/Music Discriminator," pp. 1-4, Proceedings of ICASSP-97, Apr. 2-24, Munich, Germany.

Scheirer, E.D., "Tempo and Beat Analysis of Acoustic Musical Signals," Machine Listening Group, E15-401D MIT Media Laboratory, pp. 1-21, Aug. 8, 1997, Cambridge, MA.

Schneier, Bruce, Applied Cryptography, Protocols, Algorithms and Source Code in C, Chapter 2 Protocol Building Blocks, 1996, pp. 30-31.

Smith, Alan J., "Cache Memories," Computer Surveys, Sep. 1982, University of California, Berkeley, California, vol. 14, No. 3, pp. 1-61.

Vertegaal, R. and Bonis, E., "ISEE: An Intuitive Sound Editing Environment," Computer Music Journal, 18:2, pp. 21-22, Summer 1994.

PCT Search Report PCT/US01/50295, International Search Report dated May 14, 2003, 5 Pages.

PCT Search Report PCT/US02/33186, International Search Report dated Dec. 16, 2002, pp. 1-4.

PCT Search Report PCT/US04/02748, International Search Report and Written Opinion dated Aug. 20, 2007, 6 Pages.

PCT Search Report PCT/US05/26887, International Search Report dated May 3, 2006, 2 Pages.

PCT Search Report PCT/US08/09127, International Search Report dated Oct. 30, 2008, 8 Pages.

Audible Magic Office Action for U.S. Appl. No. 09/511,632 mailed Dec. 4, 2002.

Audible Magic Office Action for U.S. Appl. No. 09/511,632 mailed May 13, 2003.

Audible Magic Office Action for U.S. Appl. No. 09/511,632 mailed Aug. 27, 2003.

Audible Magic Office Action for U.S. Appl. No. 09/511,632 mailed Feb. 5, 2004.

Audible Magic Notice of Allowance for U.S. Appl. No. 09/511,632 mailed Aug. 10, 2004.

Audible Magic Notice of Allowance for U.S. Appl. No. 10/955,841 mailed Sep. 25, 2006.

Audible Magic Notice of Allowance for U.S. Appl. No. 10/955,841 mailed Mar. 23, 2007.

Audible Magic Notice of Allowance for U.S. Appl. No. 10/955,841 mailed Sep. 11, 2007.

Audible Magic Notice of Allowance for U.S. Appl. No. 10/955,841 mailed Feb. 25, 2008.

Audible Magic Office Action for U.S. Appl. No. 08/897,662 mailed Aug. 13, 1998.

Audible Magic Notice of Allowance for U.S. Appl. No. 08/897,662 mailed Jan. 29, 1999.

Audible Magic Office Action for U.S. Appl. No. 09/706,227 mailed May 5, 2004.

Audible Magic Office Action for U.S. Appl. No. 09/706,227 mailed Nov. 12, 2004.

Audible Magic Office Action for U.S. Appl. No. 09/706,227 mailed May 9, 2005.

Audible Magic Office Action for U.S. Appl. No. 09/706,227 mailed Nov. 1, 2005.

Audible Magic Office Action for U.S. Appl. No. 09/706,227 mailed Jun. 23, 2006.

Audible Magic Office Action for U.S. Appl. No. 09/706,227 mailed Nov. 7, 2006.

Audible Magic Office Action for U.S. Appl. No. 09/706,227 mailed Mar. 29, 2007.

Audible Magic Office Action for U.S. Appl. No. 09/706,227 mailed Sep. 17, 2007.

Audible Magic Office Action for U.S. Appl. No. 09/706,227 mailed May 29, 2008.

Audible Magic Office Action for U.S. Appl. No. 09/706,227 mailed Jan. 9, 2009.

Audible Magic Office Action for U.S. Appl. No. 10/192,783 mailed Dec. 13, 2004.

Audible Magic Notice of Allowance for U.S. Appl. No. 10/192,783 mailed Jun. 7, 2005.

Audible Magic Notice of Allowance for U.S. Appl. No. 11/239,543 mailed Apr. 23, 2008.

Audible Magic Office Action for U.S. Appl. No. 09/910,680 mailed Nov. 17, 2004.

Audible Magic Office Action for U.S. Appl. No. 09/910,680 mailed May 16, 2005.

Audible Magic Office Action for U.S. Appl. No. 09/910,680 mailed Sep. 29, 2005.

Audible Magic Office Action for U.S. Appl. No. 09/910,680 mailed Jun. 23, 2006.

Audible Magic Office Action for U.S. Appl. No. 09/910,680 mailed Aug. 8, 2006.

Audible Magic Office Action for U.S. Appl. No. 09/910,680 mailed Jan. 25, 2007.

Audible Magic Office Action for U.S. Appl. No. 09/910,680 mailed Dec. 5, 2007.

Audible Magic Office Action for U.S. Appl. No. 10/072,238 mailed Oct. 25, 2005.

Audible Magic Office Action for U.S. Appl. No. 10/072,238 mailed Apr. 25, 2006.

Audible Magic Office Action for U.S. Appl. No. 10/072,238 mailed Sep. 19, 2007.

Audible Magic Office Action for U.S. Appl. No. 10/072,238 mailed Apr. 7, 2008.

Audible Magic Office Action for U.S. Appl. No. 10/072,238 mailed Oct. 1, 2008.

Audible Magic Office Action for U.S. Appl. No. 11/116,710 mailed Dec. 13, 2004.

Audible Magic Office Action for U.S. Appl. No. 11/116,710 mailed Apr. 8, 2005.

Audible Magic Office Action for U.S. Appl. No. 11/116,710 mailed Oct. 7, 2005.

Audible Magic Office Action for U.S. Appl. No. 11/116,710 mailed Apr. 20, 2006.

Audible Magic Office Action for U.S. Appl. No. 11/116,710 mailed Jul. 31, 2006.

Audible Magic Office Action for U.S. Appl. No. 11/116,710 mailed Jan. 16, 2007.

Audible Magic Notice of Allowance for U.S. Appl. No. 11/116,710 mailed Nov. 19, 2007.

Audible Magic Notice of Allowance for U.S. Appl. No. 12/042,023 mailed Dec. 29, 2008.

Audible Magic Office Action for U.S. Appl. No. 11/048,307 mailed Aug. 22, 2007.

Audible Magic Office Action for U.S. Appl. No. 11/048,307 mailed May, 16, 2008.

Audible Magic Office Action for U.S. Appl. No. 11/048,308 mailed Feb. 25, 2008.

Audible Magic Office Action for U.S. Appl. No. 11/048,338 mailed Apr. 18, 2007.

Audible Magic Office Action for U.S. Appl. No. 11/048,338 mailed Oct. 11, 2007.

Audible Magic Office Action for U.S. Appl. No. 11/048,338 mailed Jan. 14, 2008.

Audible Magic Office Action for U.S. Appl. No. 11/048,338 mailed Jul. 9, 2008.

Audible Magic Office Action for U.S. Appl. No. 11/048,338 mailed Jan. 7, 2009.

Audible Magic Office Action for U.S. Appl. No. 12/035,599 mailed Nov. 17, 2008.

Audible Magic Office Action for U.S. Appl. No. 12/035,609 mailed Dec. 29, 2008.

Audible Magic Office Action for U.S. Appl. No. 10/356,318 mailed May 24, 2006.

Audible Magic Office Action for U.S. Appl. No. 10/356,318 mailed Nov. 2, 2006.

Audible Magic Office Action for U.S. Appl. No. 10/356,318 mailed Apr. 11, 2007.

Audible Magic Office Action for U.S. Appl. No. 10/356,318 mailed Nov. 1, 2007.

Audible Magic Office Action for U.S. Appl. No. 10/356,318 mailed May 9, 2008.

Audible Magic Office Action for U.S. Appl. No. 10/356,318 mailed Jan. 6, 2009.

Audible Magic Office Action for U.S. Appl. No. 11/191,493 mailed Jul. 17, 2008.

Audible Magic Office Action for U.S. Appl. No. 11/191,493 mailed Jan. 9, 2009.

European Patent Application No. 02782170, Supplementary European Search Report Dated Feb. 7, 2007, 4 pages.

Audible Magic Office Action for U.S. Appl. No. 10/072,238 mailed May 3, 2005.

Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.

Business Wire, "IBM: IBM Announces New Descrambler Software; First to Offer Software to Work With Digital Video Chips," Jun. 5, 25, 1997, 07:49.

Gasaway Laura, Close of Century Sees New Copyright Amendments, Mar. 2000, Information Outlook, 4, 3, 42.

Harris, Lesley Ellen, "To register or not," Mar. 2006, Information Outlook, 10, 3, 32(s).

Audible Magic Notice of Allowance for U.S. Appl. No. 11/239,543 mailed Nov. 6, 2008.

Audible Magic Notice of Allowance for U.S. Appl. No. 11/239,543 mailed Feb. 25, 2009.

Audible Magic Notice of Allowance for U.S. Appl. No. 12/042,023 mailed Jun. 25, 2009.

Audible Magic Notice of Allowance for U.S. Appl. No. 11/048,307 mailed May 29, 2009.

Audible Magic Office Action for U.S. Appl. No. 11/048,308 mailed Mar. 5, 2009.

Audible Magic Notice of Allowance for U.S. Appl. No. 11/048,308 mailed Aug. 7, 2009.

Audible Magic Office Action for U.S. Appl. No. 11/048,338 mailed Jul. 6, 2009.

Audible Magic Office Action for U.S. Appl. No. 12/035,599 mailed May 29, 2009.

Audible Magic Office Action for U.S. Appl. No. 12/035,609 mailed Jun. 24, 2009.

Audible Magic Office Action for U.S. Appl. No. 10/356,318 mailed Jun. 15, 2009.

Chen, et al., Yong-Cong, A Secure and Robust Digital Watermaking Technique by the Blcok Cipher RC6 and Secure Hash Algorithm, Deparment of Computer Science, National Tsing Hua University, 2001.

Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.

Audible Magic Office Action for U.S. Appl. No. 11/048,338 mailed Dec. 28, 2009.

Audible Magic Office Action for U.S. Appl. No. 12/035,599 mailed Nov. 24, 2009.

Audible Magic Notice of Allowance for U.S. Appl. No. 12/035,609 mailed Dec. 11, 2009.

Audible Magic Office Action for U.S. Appl. No. 10/356,318 mailed Jan. 21, 2010.

Audible Magic Office Action for U.S. Appl. No. 11/191,493 mailed Apr. 28, 2009.

Audible Magic Office Action for U.S. Appl. No. 11/191,493 mailed Nov. 19, 2009.

Audible Magic Notice of Allowance for U.S. Appl. No. 12/042,023 mailed Mar. 8, 2010.

European Patent Application No. 04706547.9 European Search Report Dated Feb. 25, 2010, 3 Pages.

Audible Magic Notice of Allowance for U.S. Appl. No. 12/251,404 mailed May 14, 2010.

Audible Magic Office Action for U.S. Appl. No. 11/048,338 mailed Jun. 24, 2010.

Audible Magic Office Action for U.S. Appl. No. 12/035,599 mailed Jun. 9, 2010.

Audible Magic Notice of Allowance for U.S. Appl. No. 12/277,291 mailed May 12, 2010.

PacketHound Tech Specs, www.palisdesys.com/products/packethound/tech_specs/prod_Phtechspecs.shtml, 2002 (no month).

"How Does PacketHound Work?", www.palisadesys.com/products/packethound/how_does_it_work/prod_Phhow.shtml, 2002 (no month).

K. V. Kanth et al., "Dimensionality Reduction for Similarity Searching in Dynamic Databases," Computer Vision and Image understanding, vol. 75, Nos. 1/2 Jul./Aug. 1999, pp. 59-72, Academic Press. Santa Barbara, CA, USA.

K. Ohtsuki et al., "Topic extraction based on continuous speech recognition in broadcast-news speech," Proceedings IEEE Workshop on Automated Speech Recognition and Understanding, 1997, pp. 527-534. N. Y, N. Y., USA.

Yao Wang et al., "Multimedia Content Analysis," IEEE Signal Processing Magazine, pp. 12-36, Nov. 2000, IEEE Service Center, Piscataway, N. J., USA.

Erling Wold et al., "Content-Based Classification, Search, and Retrieval of Audio," IEEE Mulitmedia, vol. 3, No. 3, pp. 27-36, 1996, IEEE Service Center, Piscataway, N. J., USA.

Jeremy D. Zawodny, "A C Program to Compute CDDB discids on Linus and FreeBSD," [Internet] http://jeremy.zawodny.com/c/discid/discid-linux-1.3tar.gz, 1 page, Apr. 14, 2001, retrieved Jul. 17, 2007.

European Patent Application No. 02725522.3, Supplementary European Search Report dated May 12, 2006, 2 pages.

International Application No. PCT/US02/10615, International Search Report dated Aug. 7, 2002, 2 pages.

European Patent Application No. 02756525.8, Supplementary European Search Report dated Jun. 28, 2006, 4 pages.

European Patent Application No. 02752347.1, Supplementary European Search Report dated May 8, 2006, 4 pages.

* cited by examiner

US 7,877,438 B2

METHOD AND APPARATUS FOR IDENTIFYING NEW MEDIA CONTENT

RELATED APPLICATION

This application is a continuation-in-part of U.S. application Ser. No. 09/910,680, filed Jul. 20, 2001.

BACKGROUND

1. Field of the Disclosure

The present disclosure relates to data communications, and, in particular, to a novel system and apparatus for the automatic identification of new media.

2. The Prior Art

Background

Once an audio or video work has been recorded it may be both downloaded by users for play, or broadcast ("streamed") over the Internet or conventional radio or television broadcast or satellite broadcast media. When works are streamed, they may be listened to or viewed by Internet users in a manner much like traditional radio and television stations. Media streams often contain both performances of pre-recorded work and extemporaneous work, such announcements or other narrative material. Furthermore, media streams may contain no information about the work being performed, or the information provided may be imprecise.

Given the widespread use of streamed media, audio works, or video works may need to be identified. The need for identification of works may arise in a variety of situations. For example, an artist may wish to verify royalty payments or generate their own Arbitron®-like ratings by identifying how often their works are being performed. Thus, playlists of media may need to be generated. Additionally, for competitive analysis a business may wish to know when and where a competitor is placing advertising in the media. Furthermore, a broadcast source may want to know when and how often a competitive broadcast source is using pre-recorded material.

Further complicating the identification are improvements in technology allowing a tremendous number of new works to be produced, such as new song recordings, new advertisements, news worthy audio clips, and station promotions. A comprehensive playlist preferably would include these new works, which may be performed over a wide variety of media streams.

FIG. 1 shows a playlist generation system 100 of the prior art. The system 100 may include one or more remote detection modules 102 deployed at various locations throughout a broadcast area. Each detection module 102 may include an antenna 104 for receiving broadcast signals and providing the signals to an analysis and lookup module 106. The module 106 is typically configured to identify the content of the received signal by comparing its audio content against a database 108 of reference representations of known works.

If a match is made, typically the module 102 will keep a record of all matches made during a predetermined period of time. For example, the module 102 may keep a record of song titles detected during a 24-hour period.

The system 100 may further include a playlist server 110 having a processor 112 and database 114. The server 110 is typically configured to receive information such as the titles of identified songs from the one or more detection modules 102 through a network such as the Internet 109 and generate a playlist which may be stored on database 114.

However, the system 100 is typically unable to identify works for which a corresponding reference representation does not exist in the reference database.

SUMMARY

A new media identification system is disclosed. In one aspect, a system may comprise at least one analysis module for receiving and analyzing streamed work and generating a corresponding representation thereof; at least one identification (ID) server for receiving the representation from the at least one analysis module and generating a collection of unidentifiable segments in the received work.

A method for identifying new works is also disclosed. In one aspect, a method may comprise receiving an unidentified segment; determining whether the unidentified segment is similar to previously received unidentified segments; and sequentially extending similar unidentified segments into a single super segment.

BRIEF DESCRIPTION OF THE DRAWING FIGURES

DETAILED DESCRIPTION

Persons of ordinary skill in the art will realize that the following description is illustrative only and not in any way limiting. Other modifications and improvements will readily suggest themselves to such skilled persons having the benefit of this disclosure.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Exemplary Structure

Figure 1:
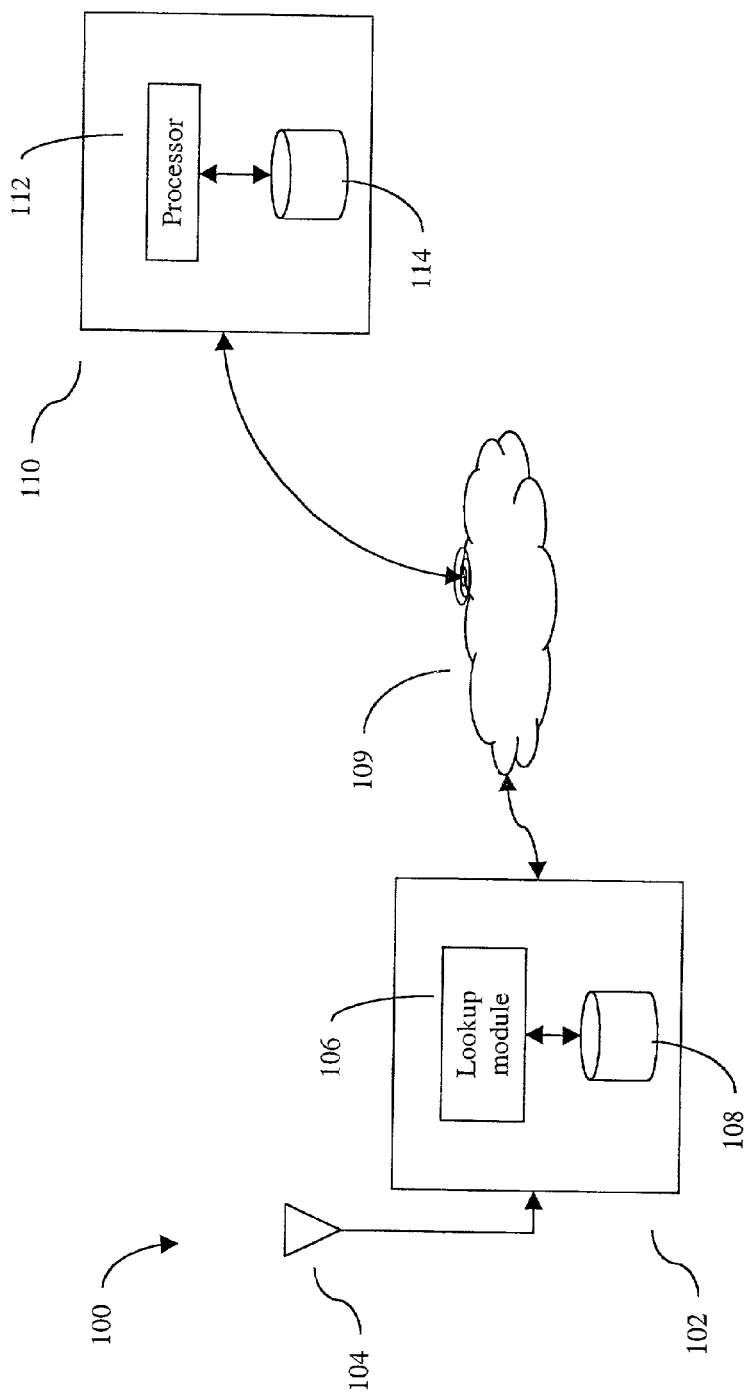
FIG. 1 is a prior art diagram of a system.
Figure 2:
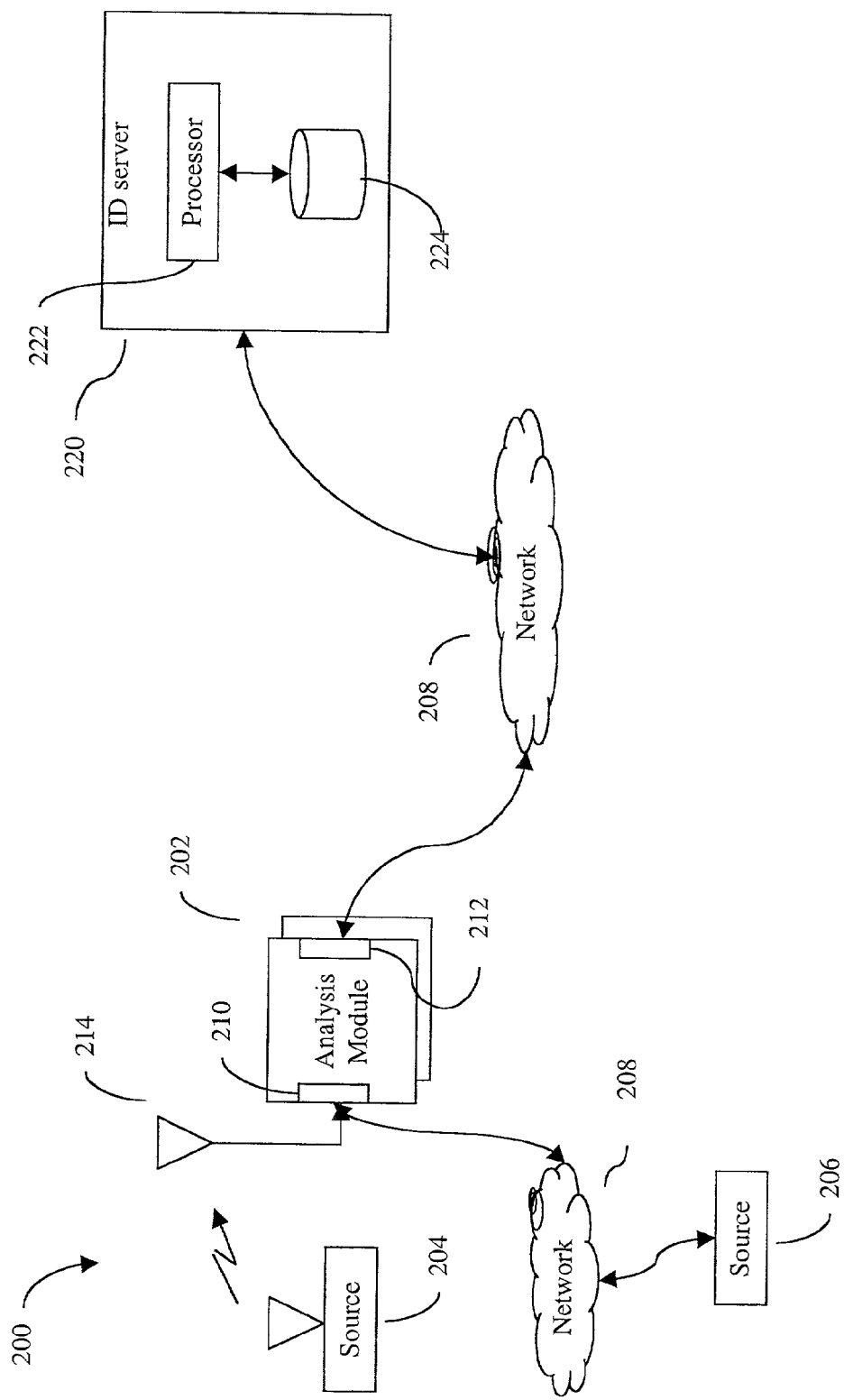
FIG. 2 is a block diagram of one aspect of a disclosed system including one or more analysis modules and ID servers.

FIG. 2 is a schematic diagram of one aspect of a disclosed playlist generation system 200. The system 200 may include at least one analysis module 202 for receiving a media stream from a broadcast source 204 as is known in the art. The analysis module may include one or more conventional antennae 214 coupled to the analysis module 202 through an input port 210. The input port 210 may include a conventional receiver for the reception of desired broadcast signals. The input port 210 may also be configured to provide remote control functionality for allowing the remote control and configuration of the receiver, such as providing for remote tuning. The input port 210 may be further configured to digitize received signals in digital formats using protocols known in the art, such as PCM.

The analysis module 202 may also be configured to receive a media stream from one or more networked sources 206. In one aspect of a disclosed system, the input port 210 of the analysis module 202 may be configured to monitor sources providing content in standard formats such as Real®, Quick-Time®, Windows Media®, MP3®, and similar formats, using hardware and software as is known in the art.

In another aspect of a disclosed system, the input port 210 may be configured to directly receive audio or video through any of the various means know in the art, such as a microphone, video acquisition system, VHS tape, or audio cassette tape. These media streams may also be provided in standard formats such as MP3, Windows Media, and similar formats. Thus, the analysis module 202 may be configured to receive a work prior to the work being presented to the broadcast system or network source. It is envisioned that this presentation could occur almost simultaneously.

The input port 210 may be operatively coupled to a network 208 through which the source 206 may be accessed. The network 208 may comprise any packet- or frame-based network known in the art, such as the Internet. The input port 210 may also be configured to access the network 208 through any means known in the art, such as through traditional copper connections. Furthermore, the input port 210 may also be configured to access the network 208 using wireless connectivity methods as known in the art, including low-power broadband methods such as Bluetooth®, or cellular-based access methods such as those used to provide wireless connectivity to cellular phones and personal digital assistants (PDAs).

The analysis module 202 may also include an output port 212 for providing connectivity to the network 208. The output port 212 may comprise a separate unit within the analysis module 202 and may include hardware and software to provide the same functionality as the input port 210. Additionally, it is contemplated that the output port 212 may comprise substantially the same circuitry as the input port 210 in order to save space and cost.

Figure 3:
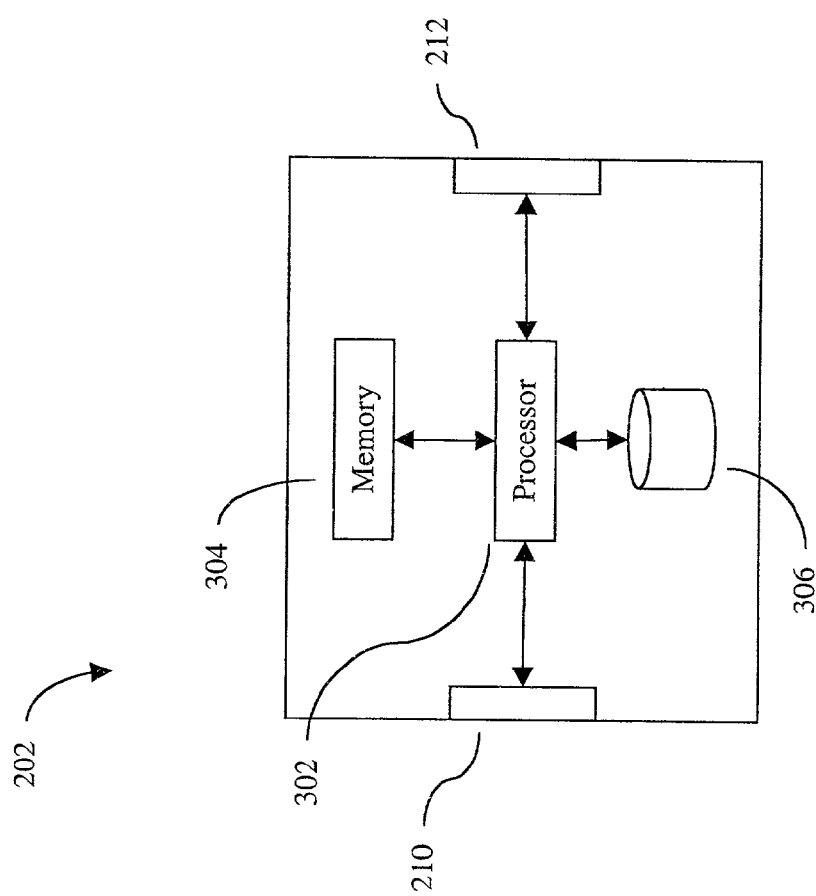
FIG. 3 is a block diagram of one aspect of an analysis module.

Referring now to FIG. 3, a conceptual block diagram of one aspect of a disclosed analysis module 202 is shown. The analysis module 202 may include a processor 302 for operating various aspects of the present disclosure. The processor 302 may be operatively disposed between the input port 210 and output port 212.

It is contemplated that any processor known in the art may be employed in the module 202, and the choice of a processor may depend on the application. For example, if the module 202 is embodied in a personal computer, the processor 202 may comprise a microprocessor capable of running conventional operating systems such as Microsoft Windows®, while if the module 202 is deployed in a mobile unit such as a PDA, the processor 202 may need only be capable of running an operating system such as Palm OS®, or other embedded systems such as may be present in a cell phone or other consumer device.

The module 202 may include ancillary hardware and software, such as conventional memory 304 and a conventional database 306 for the storage and retrieval of various aspects of the disclosed system and data.

The module 202 may be configured to generate a representation of received work which may then be used by the system to identify performed works contained in the received work. It is contemplated that a wide variety of methods may be used by the analysis module 202 to generate the representation. The analysis module may be configured to generate a representation of the received work using the psychoacoustic properties of the audio content of the received work. Such methods are known in the art. For example, the analysis module may generate feature vectors as disclosed in U.S. Pat. No. 5,918,223 to Blum, et al., which is assigned to the same assignee of the present disclosure and incorporated by reference as though fully set forth herein.

Additionally, the module 202 may use audio or video spectral or wavelet representation techniques as are known in the art. For example, other representation forms may comprise the text output of a speech recognition system, text output of a close captioned transmission, or a musical score produced by a music transcription system. In another embodiment, the representation may comprise a bit calculated key using any of the techniques as are known in the art such as MD5 hash and CRC.

The representation may also make note of significant changes in the content of a media signal. Changes in the media stream may also be indicated by a transition from one characteristic set of features to another. By way of example only, such changes may be indicated by a relatively quiet audio section, a change from heavy bass to heavy treble, a blank video frame, or a change in the relative amounts of color in successive segments.

It is contemplated that a wide variety of analysis methods may be employed singly or in combination advantageously in the present disclosure.

Referring back to FIG. 2, the system 200 may further include at least one identification (ID) server 220 for identifying an received work. The ID server 220 may identify received work using a representation received from the analysis module 202 through network 208. Though FIG. 2 shows the ID server 220 coupled to the same network 208 as the analysis module 202, it is to be understood that the various components of the present disclosure may be coupled to different networks at different times.

The ID server 220 may comprise a computer suitable for running an operating system such as Microsoft Windows®, UNIX®, LINUX®, MAC OS®, and the like. The ID server 220 may include a conventional processor 222 for operation of the server. The ID server may further include associated hardware and software known in the art such as a conventional database 224 for storing embodiments of the disclosure or data.

It is contemplated that the ID server 220 may be configured to identify received work using a variety of methods known in the art. The method for identification may correspond to the method(s) used to generate the representation within the analysis module. For example, the ID server 220 may be configured to perform identification using the methods disclosed in U.S. Pat. No. 5,918,223 to Blum, et al, if the representation were generated using corresponding methods.

Another example would be the pure spectral representations as are known in the art. It is envisioned that other representations such as wavelets may be used. The invention could also identify the received work from the speech recognized text compared against a database of song lyrics using any of a variety of methods known to those skilled in the art.

Yet another example would be any of a number of search techniques as are known in the art when the representation is a bit calculated key.

The system may also identify the received work by searching a collection of musical works for musical note sequences that correspond to the musical score in the representation.

In another configuration the system may use a combination of identification techniques, each of which correspond to a representation of the received work. By using several identification techniques, the chance of a misidentification or missed identification may be greatly reduced.

Though the analysis module and ID server are shown as being located separately, it is contemplated that they also may be co-located in a single server. For example, it is contemplated that the analysis module and ID server may each be embodied in a single board computer wherein the analysis module and ID server are housed in a single unit and operatively coupled through a common backplane.

Exemplary Operation

Figure 4:
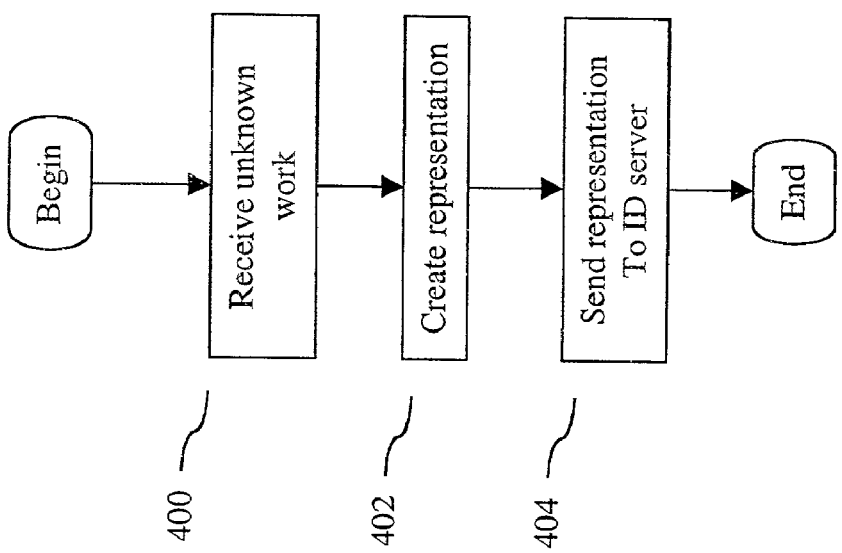
FIG. 4 is a flowchart of one aspect of a disclosed system.

FIG. 4 is a flowchart of one aspect of a disclosed method for automatically generating a playlist. The process begins in act 400, where at least one media stream is received by an analysis module. The analysis module may comprise hardware and software substantially as shown and described above.

Additionally, one or more of the analysis modules may be configured to receive a plurality of stream sources simultaneously for analysis. It is contemplated that the analysis modules may be located and configured to receive and analyze a wide variety of content, including analog radio or video, digital streaming audio or video, VHS tape, audio cassette tape or any other media.

In act 402, the analysis module then creates a representation of the received work as shown and described above. The representation may be created by the analysis module by extracting psychoacoustic properties from the received work as described above.

In act 404, the representations created by the one or more analysis modules may be provided to an ID server. The ID server may comprise hardware and software as described above. It is contemplated that the ID server may comprise a single server, multiple servers networked at a single location, or multiple servers located at different locations.

It is contemplated that the various analysis modules may provide representations to one or more ID servers in a wide variety of manners. For example, all of the analysis modules present in a system may provide representations in real-time. Or, different analysis modules may be configured to provide representations at different intervals depending on the needs of the end user. The analysis modules may transmit representations every sixty seconds, hourly, or as often as is needed.

In some cases where network connectivity is challenging, the representations may be batched up and sent to the ID server(s) once a day or less. In particularly harsh or secretive conditions, the representations may be stored within the analysis modules until the modules could be physically retrieved and operatively coupled to an ID server at another physical location.

It is contemplated that an out-of-band event may be used to trigger the transmission of representations. For example, such a trigger may comprise the initialization of a connection to a network, or the activation of media playing software or hardware.

Figure 5:
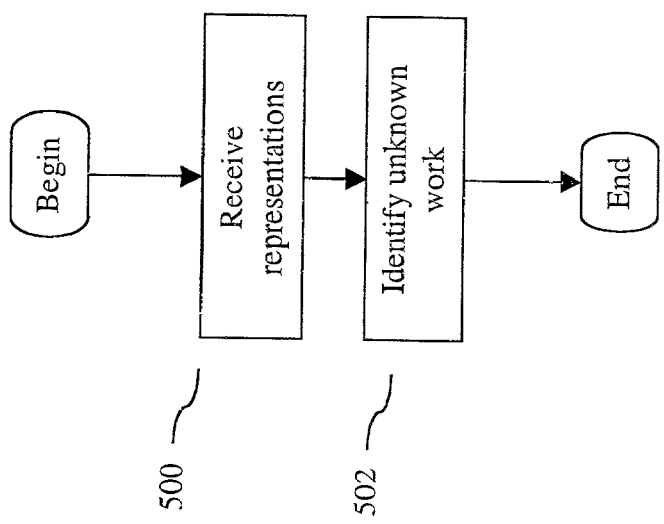
FIG. 5 is a flowchart of one aspect of a disclosed system.

FIG. 5 is a flowchart of a further disclosed aspect of a disclosed method. The process begins with act 500, where an ID server receives at least one representation of received work. The representations may be received from analysis modules as described above.

In act 502, the ID server identifies portions of the received work based upon the representation. This identification may be performed using the methods as described above. The identification may include such information as the song title, artist, label, or any other information as is known in the art that may be associated with the work. The identification information might contain information such as the name of the advertiser or a descriptive notation of an FCC broadcaster identification segment. The identification information might contain a narrative description of a news segment.

Once an identification of a received work is made, it is contemplated that a wide variety of further acts maybe performed. For example, the identifications made by the ID server may be used to construct or maintain a playlist database. Such a playlist may be stored on the ID server, or on a distant server. As will be appreciated by those skilled in the art, if representations are provided to the ID server in real-time (or near real-time depending on the equipment or network used), a playlist may be generated in corresponding real-time. Thus, a playlist may be generated in real-time from inputs provided from distant geographic locations or multiple sources that contains a comprehensive playlist of every identified media segment.

Additionally, the identification may be transmitted back to the analysis module which generated the representation. This may be advantageous where it is desired to generate a playlist for the particular analysis module's location or user. Thus, the ID server may be configured to provide an identification back to the source analysis module.

The identity of the received work may also be used for the maintenance of the system. Typically, copies of received works are stored on local drives for audit purposes. Since the intermediate representation files may be larger in size than the identities, it may be desirable to configure the analysis module to purge intermediate representations for identified works to recover drive space. It is contemplated that the ID server may be configured to transmit the identity of received works back to the generating analysis module, and the corresponding part of the representation may then be deleted from local drives by the analysis module, thereby recovering valuable capacity.

Furthermore, it is contemplated that the ID server or analysis module may be configured to send information regarding identified works to third parties, such as third-party servers. Additionally, the ID server or analysis module may be configured to provide an electronic notification to third parties of identifications made by the ID server. Examples of electronic notifications may include email, HTTP POST transactions, or other electronic communication as is known in the art. As is known by those skilled in the art, these electronic notifications may be used to initiate an action based on their content. For example, such notifications may allow the playlist to be accessed in real-time or as desired.

It is contemplated that the ID server may be configured to provide customized playlists containing information tailored to a customer's individual needs. For example, a customer may wish to be notified whenever a certain work is broadcast, or whether a particular work is broadcast on a particular media outlet. Customers may wish to have complete playlists provided to them periodically at desired intervals that may include statistics known in the art. By using the system as disclosed herein, such requests may be satisfied automatically in real-time, or at whatever interval may be desired. It is to be understood that any of the aspects of the present disclosure may be performed in real time or as often as desired.

Unidentified Segments

During the process described above, the received work presented to the system may contain segments which may not be identified. In an aspect of a disclosed system, such unidentified segments may be examined to provide useful information. For example, if a particular unidentified segment is repeated often it may contain a new song or commercial or other pre-recorded work that warrants further action.

In one aspect of a disclosed system, the ID server may examine the representations of unidentified segments, and determine that some sub-segments were actually repeat performances of a single work. Furthermore, this examination may extract a plurality of other characteristics of the original broadcast such as the amount of musical content, amount of speech content, a transcription based on speech recognition, the beat of any music present, etc. These characteristics of the unidentified segments may then be used to classify the unidentified received representations.

For example, a sub-segment that has been performed more than once may be correlated with a high amount of musical content and a certain minimum length of play time to indicate that a new song has been detected. Correlating other values and characteristics could indicate that a new advertisement has been detected. In some cases a corresponding segment of the original broadcast signal could be retrieved and played for a human to perform an identification.

Figure 6:
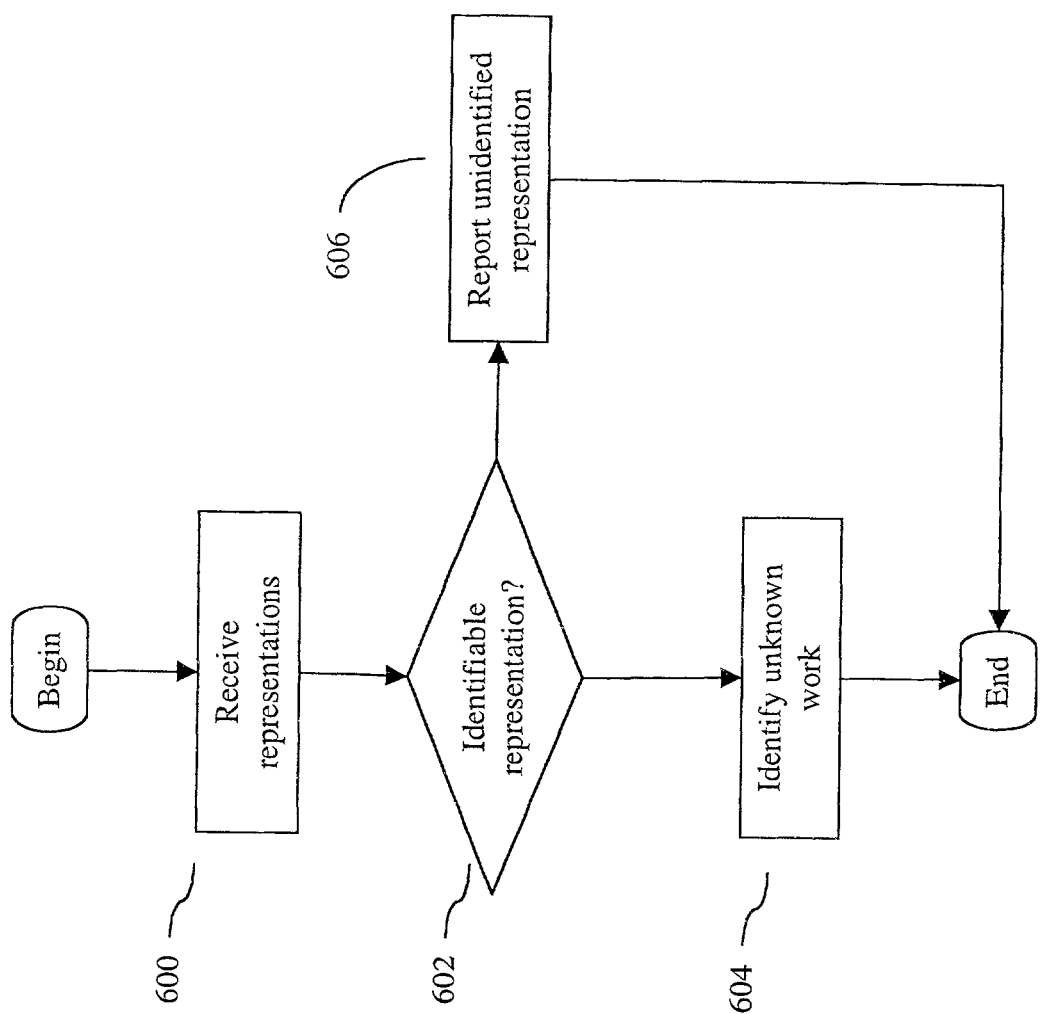
FIG. 6 is a flowchart of a further aspect of a disclosed system.

FIG. 6 is a flow diagram of a method for identifying new media content. The process of FIG. 6 may be performed by any of the structure disclosed in this disclosure.

The process of FIG. 6 begins in act 600, where a media stream is received. The received media content may be delivered over any transmission medium as disclosed above. The process of FIG. 6 may receive content from one or more media streams. It is contemplated that the received work may comprise representations provided by an analysis module to an ID server as described above. In the discussion that follows, the terms segments and representations may be used interchangeably. Furthermore, when the following discussion discloses operations on a segment, that same operation may be performed on any part of the segment, or a sub segment, where the sub segment may overlap other sub segments.

In query 602, the system determines whether the received work can be identified. If the work can be identified, the work may be identified in act 604. The determination and identification acts may be performed as disclosed above.

If the received work cannot be identified, then the unidentified segment may be reported to the system in act 606. It is contemplated that the unidentified segment may be indexed and cataloged. Additionally, a list of unidentified segments may be generated.

Figure 7:
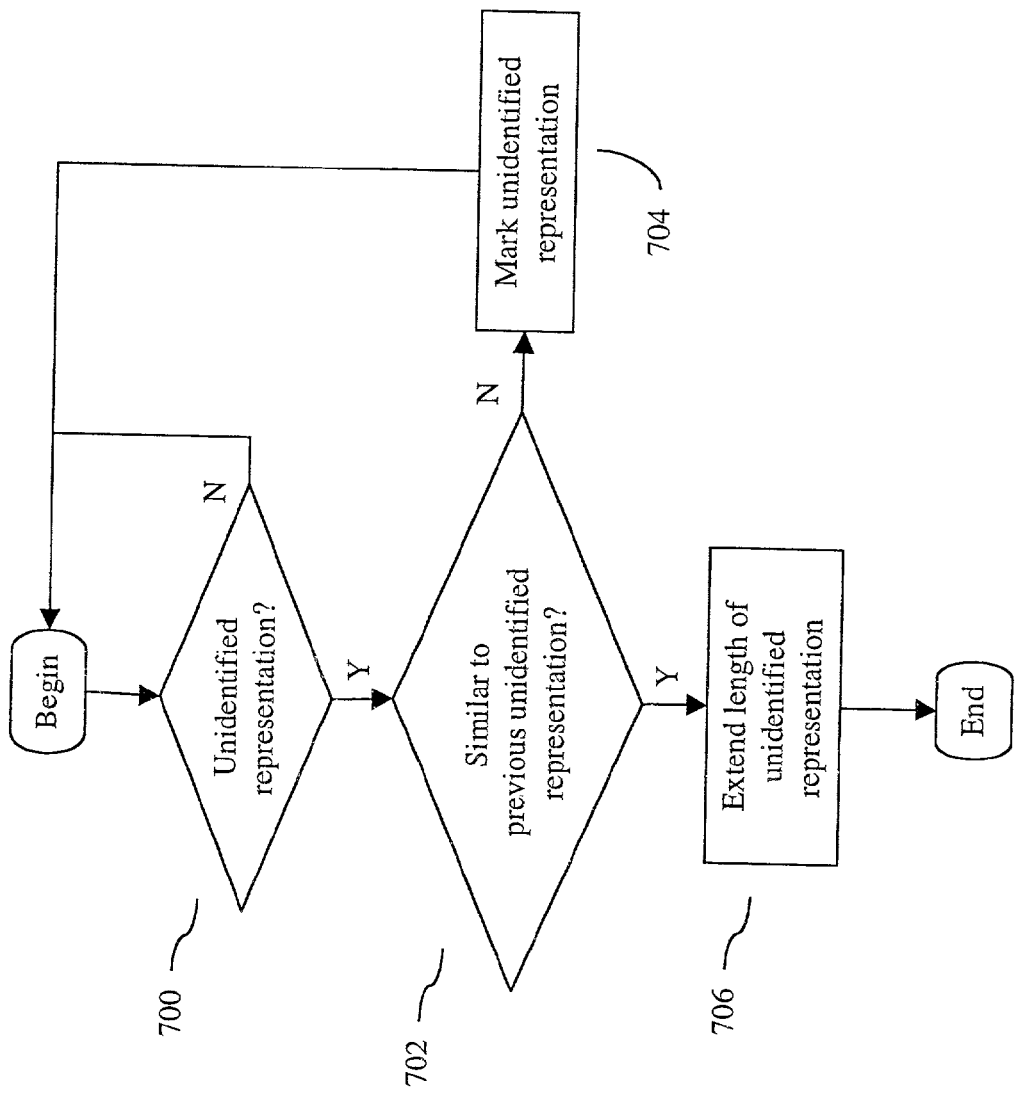
FIG. 7 is a flowchart of yet a further aspect of a disclosed system.

FIG. 7 is a flow diagram of a further aspect of identifying new media content. The process of FIG. 7 begins in query 700, where the system waits to receive an unidentified segment.

In query 702, it is determined whether the received unidentified segment is similar to any part of any previously received unidentified segment. In one embodiment, the analysis performed in query 702 may comprise decomposing each unidentified segment into a series of overlapping 5-second sub segments and comparing each unidentified sub segment against other unidentified sub segments. It is contemplated that a wide variety of similarity measurement techniques may be used, such as those used to identify segments as disclosed above. For example, a threshold for similarity may comprise the vector distance between unidentified segments computed as disclosed above. The choice of similarity measurement may dictate the length of the matching sub segments discovered.

If the unidentified segment is not determined to be similar to a previously received unidentified segment, then the segment may be indexed and cataloged in act 704. Such a segment may then serve as a reference against which future unidentified segments may be compared.

If an unidentified segment is determined to be similar to a previously received unidentified segment, the system may conclude that similar unidentified segments may be performances of the same work, e.g., from the same master recording. When the similarity comparison process indicates that the unidentified sub segment is from the same work as another unidentified sub segment, then the system may attempt to extend the length of the similar unidentified segments by 'stitching' together contiguous unidentified sub segments which also meet the criteria of being performances of the same work. These extended segments consisting of similar earlier and later unidentified segments is referred to herein as "super segments".

Groups of super segments may be created which consist of contiguous runs of unidentified segments collected from one or more media streams that may all be performances of the same work. It is contemplated that super segments may comprise any length, and may preferably have a length corresponding to standard media lengths such as 15 seconds, 30 seconds, 60 seconds, 13 minutes, or even an hour. Of course, other lengths may be used.

In a further exemplary embodiment, once a super segment has been created, it will be included in the process of FIG. 7. Thus, newly received unidentified segments may be continuously added to a particular super segment if it is determined to be similar to any of the unidentified segments which are contiguous with another super segment in the same group of super segments. This action may extend the length of each super segment in the particular group of super segments. Thus, through the analysis of the present disclosure, a listing may be produced which includes the largest possible repeating segments across all time and across all the monitored media streams.

These repeating segments may contain valuable information and may be reported on. In one embodiment, super segments may be reported on by length. For example, any repeating segments less than 63 seconds in length may represent advertisements, news segments or station promotions. In another embodiment, any repeating segments between 2 and 15 minutes may indicate a song. Additionally, longer repeating segments may indicate an entire broadcast is being repeated, such as a radio talk show or TV show.

It is contemplated that the ID server as disclosed herein may perform the process of FIG. 7. Once super segments are found, it is contemplated that a wide variety of further acts maybe performed. For example, the unidentified repeating segments found by the ID server may be used to construct or maintain a new works playlist database. Such a new works playlist may be stored on the ID server, or on a distant server. These repeating segments may be merged into a playlist report of identified media, thus making the playlist comprehensive of all master recordings. As will be appreciated by those skilled in the art, if representations are provided to the ID server in real-time (or near real-time depending on the equipment or network used), a new works playlist may be generated in corresponding real-time. Thus, a new works playlist may be generated in real-time from inputs provided from distant geographic locations or multiple sources that contains a comprehensive playlist of every unidentified media segment or super segment.

Often a substantial time interval will pass between performances of a work over a given media stream. However, the same work is often performed on several different media streams. The time between performances of the same work on different media streams may be far less than the time between performances of the work on any one media stream. Furthermore, advertisements may often play concurrently over several different media streams as the advertiser tries to achieve great consumer impact. Thus, the system described herein will preferably recognize a new work as soon as it is performed a second time on any monitored media stream.

In a further aspect, the unidentified segments and super segments may be transmitted back to the analysis module which generated the representation. This may be advantageous where it is desired to generate a new work playlist for the particular analysis module's location or user. Thus, the ID server may be configured to provide unidentified segments or super segments back to the source analysis module. In this case, the source analysis module may decide to hold the original source audio corresponding to the new work super segment for future identification through more traditional, human based, methods.

Furthermore, it is contemplated that the ID server or analysis module may be configured to send information regarding detected new works to third parties, such as third-party servers. Additionally, the ID server or analysis module may be configured to provide an electronic notification to third parties of new work detection made by the ID server. Examples of electronic notifications may include email, HTTP POST transactions, or other electronic communication as is known in the art. As is known by those skilled in the art, these electronic notifications may be used to initiate an action based on their content. For example, such notifications may allow the new works playlist to be accessed in real-time or as desired. The identification of a new work may be used to raise an alert that a new advertisement, song, or news clip has just been released to media casters.

It is contemplated that the ID server may be configured to provide customized new work playlists containing information tailored to a customer's individual needs. For example, a customer may wish to be notified whenever a new work with certain characteristics, as described above, is detected, or whenever a particular type of new work is detected on a particular media outlet. For example, new works reports may be generated which classify super segments based on length. Customers may wish to have complete new work playlists provided to them periodically at desired intervals that may include statistics known in the art. By using the system as disclosed herein, such requests may be satisfied automatically in real-time, or at whatever interval may be desired. It is to be understood that any of the aspects of the present disclosure may be performed in real time or as often as desired.

While embodiments and applications have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A new media identification system comprising:
    at least one analysis module, including a first processor and a first memory, for receiving transmission of signals from at least one source, the signals including data from a portion of a master recording, dividing said data into a plurality of segments, generating a segment representation of each of the plurality of segments, and transmitting said segment representation to an identification server; and
    at least one identification server, including a second processor and a second memory, for receiving said segment representation from said at least one analysis module, comparing said segment representation to a plurality of reference segment representations, determining that said segment representation is not identified, and adding said segment representation to a list for holding a plurality of unidentified segment representations;
    wherein one of said at least one analysis module and said identification server is configured to compare segment representations of unidentified segments to segment representations of other unidentified segments, wherein the comparison comprises:
        dividing a first unidentified segment representation into first sub-segments and a second unidentified segment representation into second sub-segments;
        comparing the first sub-segments to the second sub-segments;
        identifying a first subset of the first sub-segments that matches a second subset of the second sub-segments, wherein the first subset is a sequential run of the first sub-segments and the second subset is a sequential run of the second sub-segments; and
        determining that the first subset and the second subset are associated with a performance of the same master recording;
    wherein one of said at least one analysis module and said identification server is configured to create a representation of a super segment by combining the sequential run of sub-segments of at least one of the first subset or the second subset.

2. The system of claim 1, wherein said at least one analysis module further includes an input port configured to receive said transmission of signals from at least one networked source.

3. The system of claim 1, wherein said at least one analysis module further includes an input port configured to receive said transmission of signals from at least one broadcast source.

4. The system of claim 1, wherein said at least one analysis module further includes an input port configured to receive said transmission of signals in the form of a pre-broadcast digital form.

5. The system of claim 1, wherein said at least one analysis module and said at least one identification server may be coupled over a network.

6. The system of claim 5, wherein said network comprises the Internet.

7. The system of claim 1, wherein said segment representation comprises feature vectors.

8. The system of claim 1, wherein said segment representation comprises a spectral representation of said received master recording.

9. The system of claim 1, wherein said segment representation comprises the text output of a speech recognition system.

10. The system of claim 1, wherein said segment representation comprises the musical score output of a music transcription system.

11. The system of claim 1, wherein said segment representation comprises a bit calculated key.

12. The system of claim 1, wherein said segment representation includes an indication of significance of changes in media signal content.

13. The system of claim 1, wherein said at least one analysis modules are further configured to receive transmissions of signals from a plurality of streaming sources for analysis at a single location.

14. The system of claim 1, wherein said at least one analysis modules are further configured to receive transmissions of signals from a plurality of streaming sources for analysis at a plurality of different access points of the network.

15. The system of claim 1, wherein said at least one analysis module is configured to provide said segment representations to said at least one identification server at a predetermined time interval.

16. The system of claim 15, wherein said predetermined time interval comprises at least once a day.

17. The system of claim 15, wherein said predetermined time interval comprises approximately once an hour.

18. The system of claim 15, wherein said at least one analysis module is configured to provide said segment representations to said at least one identification server responsive to receiving said transmission.

19. The system of claim 15, wherein said at least one analysis module is configured to provide said segment representations to said at least one identification server when a predetermined threshold of resource utilization is crossed.

20. The system of claim 15, wherein said at least one analysis module is configured to provide said segment representations to said at least one identification server based on an out-of-band event.

21. The system of claim 1, wherein said identification server is further configured to generate a playlist of identified master recordings.

22. The system of claim 1, wherein said identification server is further configured to generate a playlist of identified master recordings received from different access points of the network responsive to receiving said transmission.

23. The system of claim 1, wherein said system is further configured to create groups of representations of super segments comprising repeat performances of the same master recording.

24. The system of claim 1, wherein said data is collected from a plurality of media streams.

25. The system of claim 1, wherein said system is further configured to report representations of super segments based on length.

26. The system of claim 25, wherein any repeating super segments less than 63 seconds in length are reported as advertisements.

27. The system of claim 25, wherein any repeating super segments between 2 and 15 minutes are reported as a song.

28. The system of claim 25, wherein any repeating super segments exceeding 5 seconds are reported as a repeated broadcast.

29. The system of claim 28, wherein said repeated broadcast comprises a radio talk show.

30. The system of claim 28, wherein said repeated broadcast comprises a TV show.

31. The system of claim 25, wherein any repeating super segments between 5 and 15 seconds are reported as station identification.

32. The system of claim 1, wherein said representation of the super segment represents an unidentifiable master recording, and is used to construct a new media playlist database.

33. The system of claim 32 wherein said new media playlist is stored on said identification server.

34. The system of claim 32, wherein said new media playlist is stored on a distant server.

35. The system of claim 32, wherein repeating segment representations are merged into a playlist report of identified media.

36. The system of claim 32, wherein said representation of the super segment is provided to the identification server responsive to receiving said transmission, and said new media playlist is generated responsive to receiving said representation of the super segment.

37. The system of claim 1, further configured to implement a Least Recently Used (LRU) algorithm to remove reference samples from a reference database that have not been identified in a predetermined amount of time.

38. The system of claim 1, further configured to provide an electronic notification to third parties of new media detections made by said system.

39. A method for identifying new media, implemented by a computing system programmed to perform the following, comprising:
receiving a media stream;
dividing said media stream into a plurality of segments;
determining that at least one of said plurality of segments is an unidentified segment by an identification server;
dividing the unidentified segment into first sub-segments and a previously received unidentified segment into second sub-segments;
comparing the first sub-segments to the second sub-segments;
identifying a first subset of the first sub-segments that matches a second subset of the second sub-segments, wherein the first subset is a sequential run of the first sub-segments and the second subset is a sequential run of the second sub-segments;
determining that the first subset and the second subset are associated with a performance of a single master recording; and
arranging the sequential run of sub-segments in at least one of the first subset or the second subset into a single super segment.

40. The method of claim 39, further comprising:
decomposing said super segment into overlapping sub-segments;
comparing each of the overlapping sub-segments to additional overlapping sub-segments of additional super segments; and
identifying a repeat performance of a master recording if at least one of the overlapping sub-segments matches one of the additional overlapping sub-segments.

41. The method of claim 40, where the overlapping sub-segments are approximately 5 seconds in length.

42. The method of claim 40, further including the act of adding a newly received segment to said super segment if said newly received segment is determined to be similar to any of said segments which constitute said super segment.

43. The method of claim 39, further including the act of reporting super segments by length.

44. The method of claim 43 wherein a super segment of less than 63 seconds is reported as an advertisement.

45. The method of claim 43, wherein a super segment of less than approximately 63 seconds in length is reported as a news segment.

46. The method of claim 43, wherein a super segment of less than 63 seconds is reported as a station promotion.

47. The method of claim 43, wherein a super segment between approximately 2 and 15 minutes in length is reported as a song.

48. The method of claim 43, wherein a super segment between approximately 5 and 15 seconds is reported as a station identification.

49. The method of claim 43, wherein a super segment longer than approximately 23 minutes in length is reported as an entire broadcast.

50. The method of claim 39 wherein super segments that are repeat performances of the same master recording are grouped together.

51. The method of claim 50, wherein said super segments are further reported on based on their length.

52. A method for processing media where segments of unknown content are presented for analysis comprising:
receiving a transmission;
dividing said transmission into a plurality of segments;
determining whether each of said plurality of segments is an unidentified segment by an identification server;
dividing each of the unidentified segments into a plurality of sub-segments;
comparing each of a first plurality of sub-segments from a first unidentified segment to a second plurality of sub-segments from a second unidentified segment;
identifying a first subset of the first plurality of sub-segments that matches a second subset of the second plurality of sub-segments, wherein the first subset is a sequential run of the first plurality of sub-segments and the second subset is a sequential run of the second plurality of sub-segments;
recognizing that the first subset and the second subset are both associated with a performance of a single master recording;
creating a super segment by combining the sequential run of sub-segments in at least one of the first subset and the second subset; and
analyzing said super segment, wherein said analysis comprises an identification of the super segment.

53. The method of claim 52, wherein said analysis comprises a statistical analysis of the super segment.

54. The method of claim 52, wherein said analysis provides input to the generation of a playlist.

55. The method of claim 52, wherein said analysis is performed by an automated system.

56. The method of claim 52, wherein said analysis is performed by a human.

57. The method of claim 52, where the analysis provides identification of the single master recording.

58. The method of claim 52, where the analysis is correlated back to an original media stream.

59. A system for identifying new media comprising:
a memory, to store instructions for identifying the new media; and
a processor, connected with the memory, to execute the instructions, wherein the instructions cause the processor to:
receive a media stream;
divide said media stream into a plurality of segments;
determine that at least one of said plurality of segments is an unidentified segment;
divide the unidentified segment into first sub-segments and a previously received unidentified segment into second sub-segments;
compare the first sub-segments to the second sub-segments;
identify a first subset of the first sub-segments that matches a second subset of the second sub-segments, wherein the first subset is a sequential run of the first sub-segments and the second subset is a sequential run of the second sub-segments;
determine that the first subset and the second subset are associated with a performance of a single master recording; and
arrange the sequential run of sub-segments of at least one of the first subset or the second subset into a single super segment.

60. The system of claim 59, wherein the instructions further to cause the processor to:
decompose said super segment into overlapping sub-segments;
compare each of the overlapping sub-segments to additional overlapping sub-segments of additional super segments; and
identify a repeat performance of a master recording if at least one of the overlapping sub-segments matches one of the additional overlapping sub-segments.

61. The system of claim 60, wherein the instructions further to cause the processor to add newly received segments to said super segment if said newly received segments are determined to be similar to any of said segments which constitute said super segment.

62. The system of claim 59, wherein the instructions further to cause the processor to report super segments by length.

63. The system of claim 62 wherein a super segment of less than 63 seconds are reported as an advertisement.

64. The system of claim 62, wherein a super segment of less than approximately 63 seconds in length are reported as a news segment.

65. The system of claim 62, wherein a super segment of less than 63 seconds are reported as a station promotion.

66. The system of claim 62, wherein a super segment between approximately 2 and 15 minutes in length are reported as a song.

67. The system of claim 62, wherein a super segment longer than approximately 23 minutes in length is reported as an entire broadcast.

68. The system of claim 59, wherein the instructions further to cause the processor to group super segments together that are repeat performances of the same master recording.

69. The system of claim 68, wherein said super segments are further reported on based on their length.

70. A system of processing media where segments of unknown content are presented for analysis comprising:
a memory, to store instructions for processing the media; and
a processor, connected with the memory, to execute the instructions, wherein the instructions cause the processor to:
receive a transmission;
divide said transmission into a plurality of segments;
determine whether each of said plurality of segments is an unidentified segment;
divide each of the unidentified segments into a plurality of sub-segments;
compare each of a first plurality of sub-segments from a first unidentified segment to a second plurality of sub-segments from a second unidentified segment;
identify a first subset of the first plurality of sub-segments that matches a second subset of the second plurality of sub-segments, wherein the first subset is a sequential run of the first plurality of sub-segments and the second subset is a sequential run of the second plurality of sub-segments;

recognize that the first subset and the second subset are both associated with a performance of a single master recording;

create a super segment by combining the sequential run of sub-segments in at least one of the first subset and the second subset; and analyze said super segment, wherein said analysis comprises an identification of the super segment.

71. The system of claim 70, wherein said analysis comprises a statistical analysis of the super segment.

72. The system of claim 70, wherein said analysis provides input to the generation of a playlist.

73. The system of claim 70, wherein said analysis is performed by an automated system.

74. The system of claim 70, wherein said analysis is performed by a human.

75. The system of claim 70, where said analysis provides identification of new master recordings.

76. The system of claim 70, where said analysis includes correlating analysis results back to an original media stream.

77. A non-transitory program storage device readable by a machine, tangibly embodying a program of instructions executable by the machine to perform a method for identifying new media, said method comprising:

receiving a media stream;

dividing said media stream into a plurality of segments;

determining that at least one of said plurality of segments is an unidentified segment by an identification server;

dividing the unidentified segment into first sub-segments and a previously received unidentified segment into second sub-segments;

comparing the first sub-segments to the second sub-segments;

identifying a first subset of the first sub-segments that matches a second subset of the second sub-segments, wherein the first subset is a sequential run of the first sub-segments and the second subset is a sequential run of the second sub-segments;

determining that the first subset and the second subset are associated with a performance of a single master recording; and arranging the sequential run of sub-segments of at least one of the first subset or the second subset into a single super segment.

78. The non-transitory program storage device of claim 71, the method further comprising:

decomposing said super segment into overlapping sub-segments;

comparing each of the overlapping sub-segments to additional overlapping sub-segments of additional super segments; and identifying a repeat performance of a master recording if at least one of the overlapping sub-segments matches one of the additional overlapping sub-segments.

79. The non-transitory program storage device of claim 78, where the overlapping sub-segments are approximately 5 seconds in length.

80. The non-transitory program storage device of claim 77, further including the act of adding newly received segments to said super segment if said newly received segments are determined to be similar to any of said segments which constitute said super segment.

81. The non-transitory program storage device of claim 77, further including the act of reporting super segments by length.

82. The non-transitory program storage device of claim 81 wherein a super segment of less than 63 seconds are reported as an advertisement.

83. The non-transitory program storage device of claim 81, wherein a super segment of less than approximately 63 seconds in length are reported as a news segment.

84. The non-transitory program storage device of claim 81, wherein a super segment of less than 63 seconds are reported as a station promotion.

85. The non-transitory program storage device of claim 81, wherein a super segment between approximately 2 and 15 minutes in length are reported as a song.

86. The non-transitory program storage device of claim 81, wherein a super segment between approximately 5 and 15 seconds in length are reported as a station identification.

87. The non-transitory program storage device of claim 81, wherein a super segment longer than approximately 23 minutes in length is reported as an entire broadcast.

88. The non-transitory program storage device of claim 77 wherein super segments that are repeat performances of the same master recording are grouped together.

89. The non-transitory program storage device of claim 77, wherein said super segments are further reported on based on their length.

90. A non-transitory program storage device readable by a machine, tangibly embodying a program of instructions executable by the machine to perform a method for processing media where repeated segments of unknown content are presented for analysis comprising:

receiving a transmission;

dividing said transmission into a plurality of segments;

determining whether each of said plurality of segments is an unidentified segment by an identification server;

dividing each of the unidentified segments into a plurality of sub-segments;

comparing each of a first plurality of sub-segments from a first unidentified segment to a second plurality of sub-segments from a second unidentified segment;

identifying a first subset of the first plurality of sub-segments that matches a second subset of the second plurality of sub-segments, wherein the first subset is a sequential run of the first plurality of sub-segments and the second subset is a sequential run of the second plurality of sub-segments;

recognizing that the first subset and the second subset are both associated with a performance of a single master recording;

creating a super segment by combining the sequential run of sub-segments in at least one of the first subset and the second subset; and analyzing said super segment, wherein said analysis comprises an identification of the super segment.

91. The non-transitory program storage device of claim 90, wherein said analysis comprises a statistical analysis of the super segment.

92. The non-transitory program storage device of claim 90, wherein said analysis provides input to the generation of a playlist.

93. The non-transitory program storage device of claim 90, wherein said analysis is performed by an automated system.

94. The non-transitory program storage device of claim 90, wherein said analysis is performed by a human.

95. The non-transitory program storage device of claim 90, where the analysis provides identification of new master recordings.

96. The non-transitory program storage device of claim 90, where the analysis is correlated back to an original media stream.

* * * * *